G. H. PEKRUL.
THRESHING MACHINE.
APPLICATION FILED AUG. 6, 1918.

1,333,278.

Patented Mar. 9, 1920.
7 SHEETS—SHEET 3.

WITNESSES

INVENTOR
Gus H. Pekrul

BY

ATTORNEY

G. H. PEKRUL.
THRESHING MACHINE.
APPLICATION FILED AUG. 6, 1918.

1,333,278.

Patented Mar. 9, 1920.
7 SHEETS—SHEET 5.

INVENTOR
Gus H. Pekrul

WITNESSES
W. C. Fielding
Dwight S. Talt

BY
Richard Owen
ATTORNEY

G. H. PEKRUL.
THRESHING MACHINE.
APPLICATION FILED AUG. 6, 1918.

1,333,278.

Patented Mar. 9, 1920.
7 SHEETS—SHEET 6.

INVENTOR
Gus H. Pekrul

WITNESSES

BY

ATTORNEY

UNITED STATES PATENT OFFICE.

GUS H. PEKRUL, OF GOLTRY, OKLAHOMA.

THRESHING-MACHINE.

1,333,278.                    Specification of Letters Patent.    Patented Mar. 9, 1920.

Application filed August 6, 1918. Serial No. 248,602.

*To all whom it may concern:*

Be it known that I, GUS H. PEKRUL, a citizen of the United States, residing at Goltry, in the county of Alfalfa and State of Oklahoma, have invented certain new and useful Improvements in Threshing-Machines, of which the following is a specification.

This invention relates to threshing machines, having for its primary object to generally improve the construction of such machines so as to enhance the practicability of the same.

A further object of the invention is to provide a threshing mechanism which is equipped with a threshing cylinder and concave of improved construction, whereby much of the grain is assured of being separated from the stalks at the initial operation.

A further object of the invention is to provide improvements in the means for mounting and operating the straw shakers, as well as improved means for directing the material delivered from the threshing cylinder upon the shakers, the particular construction enabling the greatest possible amount of benefit to be derived from the amount of energy employed.

Further objects reside in providing a grain pan of improved construction and operation; an improved sieve shoe; improved means for mounting the sieves within the shoe; improved fan construction for directing a blast of air through the sieve shoe and chaffer; improved means for delivering the grain from the machine; improved means for returning the chaff to the threshing cylinder to be again operated upon; as well as improved means for removing the straw from the machine.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:

Figure 1$^a$ is a side elevation of the threshing machine constructed in accordance with the invention, Fig. 1$^b$ is a similar view of the opposite side of the machine, Figs. 2$^A$ and 2$^B$ represent sectional views upon a slightly enlarged scale taken through the fore and rear parts of the machine and longitudinally thereof, Fig. 14 is a detail perspective view of one of the grates or screens used in the improved concave.

The threshing machine of my invention is portable, and is mounted upon a vehicle including a body frame indicated generally at 16, the forward end of which is supported upon the front axle 17 while the rear end rests upon the rear axle 18. The housing for the improved mechanism is indicated at 19, and may be of any suitable size, shape and construction. Each side of the body 19 is provided at appropriate places with doors 20 to permit of access to the interior of the housing being had for the purpose of adjustment or repair or inspection of any of the movable parts.

Figure 2:
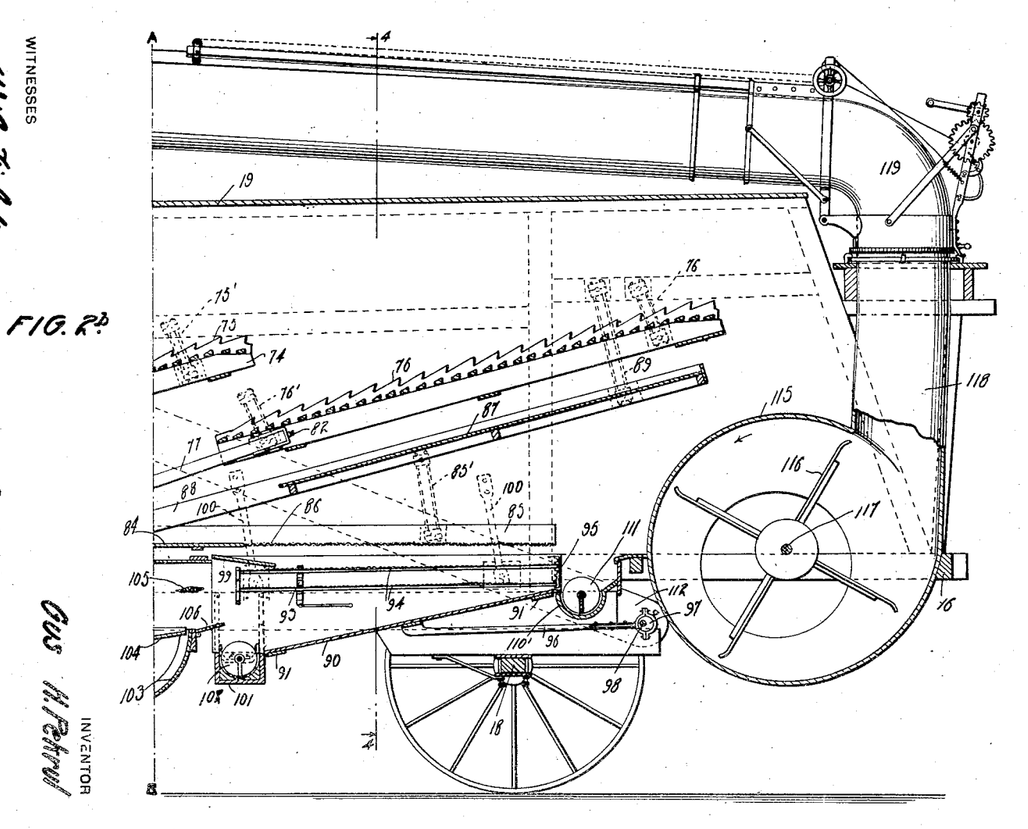
Figures 2A, 14, 15:
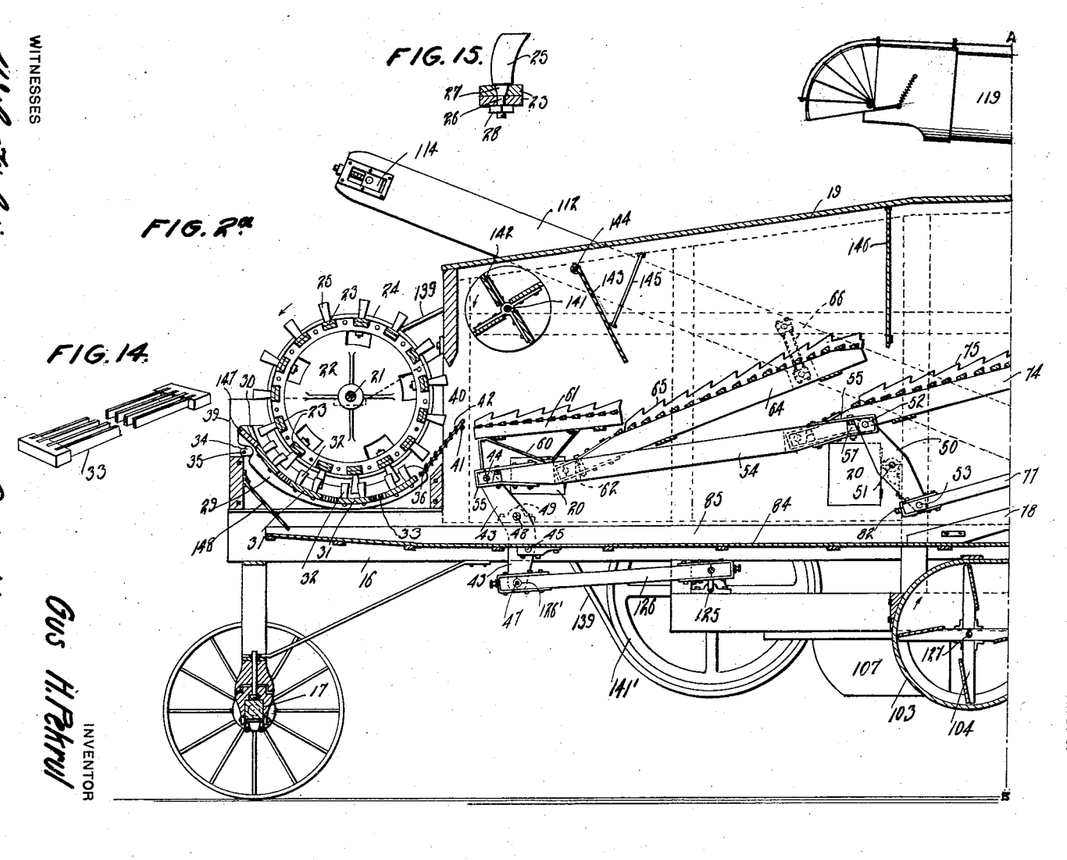
Figures 3, 16:
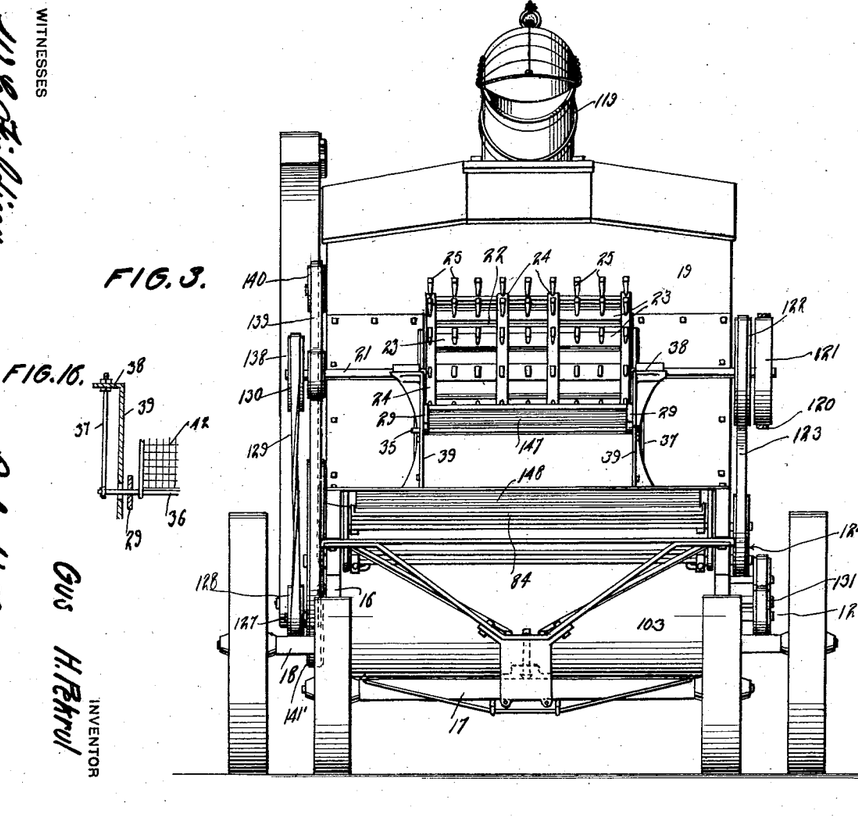
Fig. 3 is a front elevation of the threshing machine.
Fig. 16 is a detail view illustrating the manner of adjusting one end of the concave.
Figure 4:
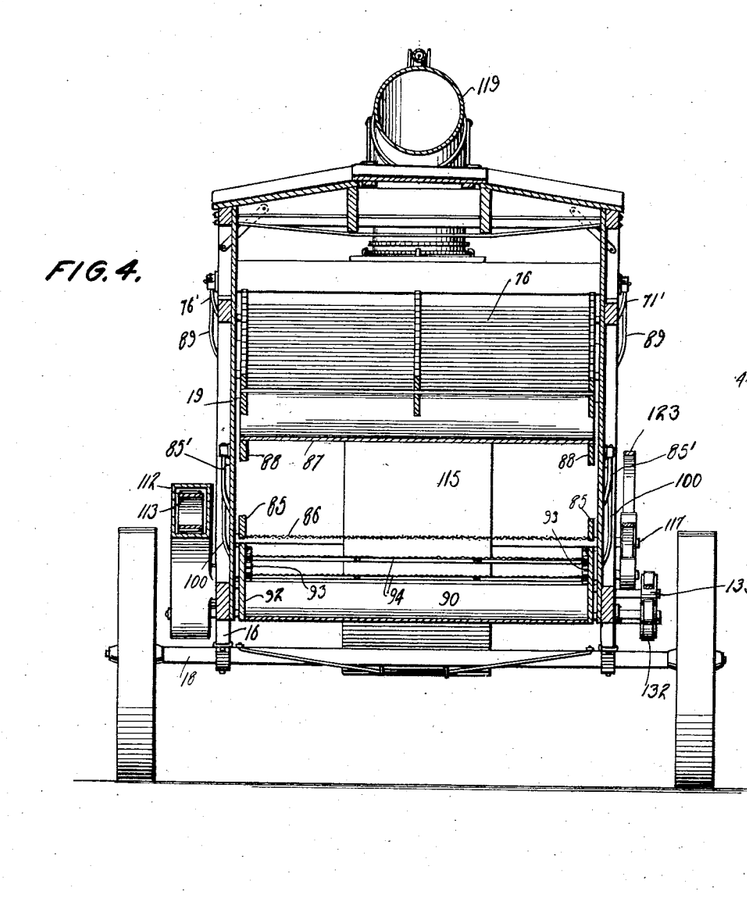
Fig. 4 is a vertical transverse sectional view taken substantially upon line 4—4 of Fig. 2$^B$.

The threshing cylinder and concave therefor are arranged at the forward end of the vehicle and transversely thereof, a shaft 21 being provided for the support of the said cylinder. This cylinder comprises a plurality of spaced heads 22 keyed or in any other preferred manner secured upon the shaft 21 in spaced relation, and the said heads are connected by the longitudinally disposed bars indicated generally at 23. These bars are held in proper position upon the cylinder heads by the bands 24. Any number of the heads 22 may be employed; four being used in the present instance. The bars 23 are arranged in spaced relation around the periphery of the cylinder, and each is provided with a series of teeth 25. Each of the members 23 comprises a pair of bars of equal length and width, arranged face to face and being connected to the cylinder heads. The outer bar is provided with a series of spaced openings rectangular in shape, and tapering slightly inwardly, while the inner bar is equipped with circular openings to register with the openings in the outer bar. These alined openings receive the shanks 26 of the teeth 25, each shank being provided with a squared portion 27 tapering inwardly, and the squared portions fit snugly within the correspondingly shaped openings in the outer bar. Retaining nuts 28 are threaded upon the inner extremities of the shanks, and it is obvious, therefore, that this particular construction and arrangement of the teeth and shanks enables the teeth to be firmly held in proper position upon the cylinder bars and assist in firmly holding the bars properly positioned upon the cylinder. Any number of such teeth may be used.

The concave includes a pair of arcuate end members indicated at 29, each of which is provided in its inner surface with an arcuate channel or groove 30. The grooves or channels and end members are substantially concentric with the threshing cylinder.

The end members 29 are connected by relatively narrow bars 31, each of which is provided with a plurality of upstanding teeth 32, adapted to coöperate with the teeth in the threshing cylinder to separate the grain from the material fed to the machine. The bars 31 rest at their ends in the channels 30 in the end members, and the various concaved bars are separated by screens or grates 33 also resting at their ends in the channels 30. The bars 31 and grates 33 may vary in width, and any preferred number of such elements may be used in the concave as occasion requires. It is obvious that this particular construction of the concave enables the grain threshed during the operation of the cylinder to at once pass through the concave and into the grain pan, the particular formation and arrangement of grates enabling a much more free passage of the grain than the ordinary foraminous concave heretofore used for this purpose.

The forward ends of the end members 29 are recessed as shown particularly in Fig. 2ᴬ, and these recesses receive the rounded ends of rock arms 34. The rock arms are firmly attached to the adjusting shaft 35 extending transversely of the vehicle, and it is obvious that rotary movement applied to this shaft will cause the forward end of the concave to be raised or lowered, according to the direction of rotation of the shaft. This operation of the mechanism will cause the teeth of the concave to be moved close to or remote from the teeth of the cylinder, which adjustment is desirable in operating upon grains of different characters.

The rear ends of the concave side members 29 are connected by a transverse rod 36, the ends of which are connected to upwardly extending hanger rods 37 passing through suitable outwardly projecting flanges 38 on the uprights 39 provided for the support of the threshing cylinder, and adjusting nuts upon the upper extremities of these hanger rods enable the latter to be adjusted at will. It is obvious, therefore, that the rear end as well as the front end of the concave may be minutely adjusted.

The forward end of the housing 19 is provided with an opening 40, through which the material operated upon by the threshing cylinder is directed. A rod or bar 41 is disposed transversely of the housing within the opening 40, and supports the free end of a screen 42 affixed at its forward end to the cross rod 36.

The straw shaker mechanism, which will now be described, is confined wholly by the housing 19 upon the vehicle, and is designed to receive material after it is operated upon by the threshing cylinder.

Figure 6:
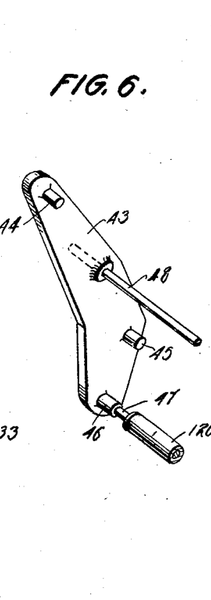
Fig. 6 is a similar view of the operating arms for the shakers and grain pan.

Arranged at the sides of the frame 16 within the casing 19 near the forward end thereof are rocker arms 43. A detail view of one of these rocker arms is shown in Fig. 6 of the drawings, and it will be observed that the rocker arm is provided at its upper end with an inwardly projecting boss or pintle 44, being also provided with pintles or bosses 45 and 46 near its lower end. The lowest of the bosses, or the one indicated at 46, is hollow and receives the end of a rod 47. This rod extends at its opposite end in a suitable opening in the boss upon the opposing side of the machine, and the rod is designed to support a tubular member, the purpose of which will appear hereafter. The rock arm is supported by a shaft or rod 48, the latter being mounted in bearings 49 at the sides of the machine.

Figure 5:
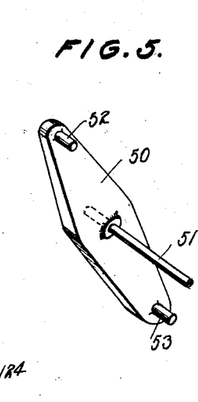
Fig. 5 is a perspective view illustrating one of the rocker arms for supporting the shaker.

A second pair of rock arms 50 is arranged within the housing in the rear of the rock arms 43 and slightly above the horizontal plane of the latter; the details of the rock arms 50 being shown in Fig. 5 of the drawings. These rock arms are arranged one at each side of the housing, and are supported by the rod or bar 51. The upper and lower extremities of the rock arms 50 are provided with inwardly projecting studs or pintles 52 and 53 respectively. The pintles or studs 44—52 upon the arms 43 and 50 at each side of the housing support the forward and rear ends respectively of beams 54, the latter being provided for the support of the straw shakers. These beams are each provided at their ends with strap members 55, having confined therein the sectional bearing boxes 56 which inclose the pintles 44—52, and the bearing blocks are adjusted within the strap members by the movements of the wedge block 57, the latter being controlled in its movements by the adjustment of nuts 58 upon bolt 59.

Brackets 60 are supported by the beams 54 at the forward ends thereof, and these brackets carry a receiving straw shaker indicated generally at 61. This shaker is of equal width with the housing, but it is of relatively short length, being substantially horizontally disposed. The shaker may be of conventional form, having spaced laterally disposed slats as well as the longitudinally disposed fish-backs as shown. The forward end of this shaker is disposed in substantially the same horizontal plane with the rear end of the screen 42, and is designed to receive material discharged from the threshing cylinder.

Figure 1:
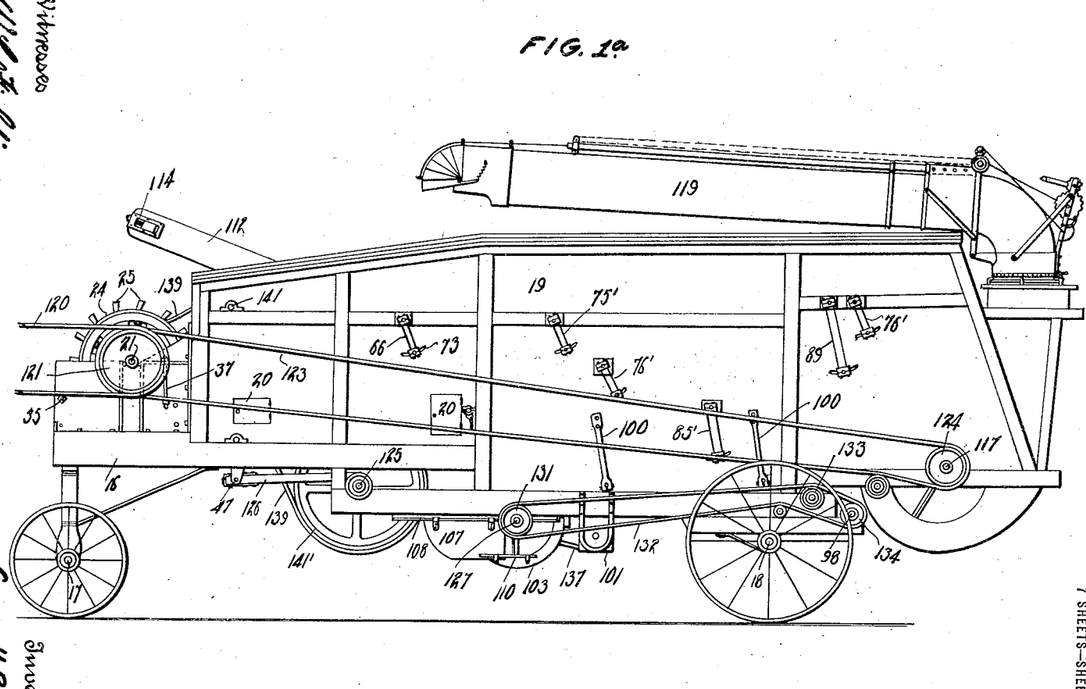
Figures 7, 8, 9, 10, 12, 13:
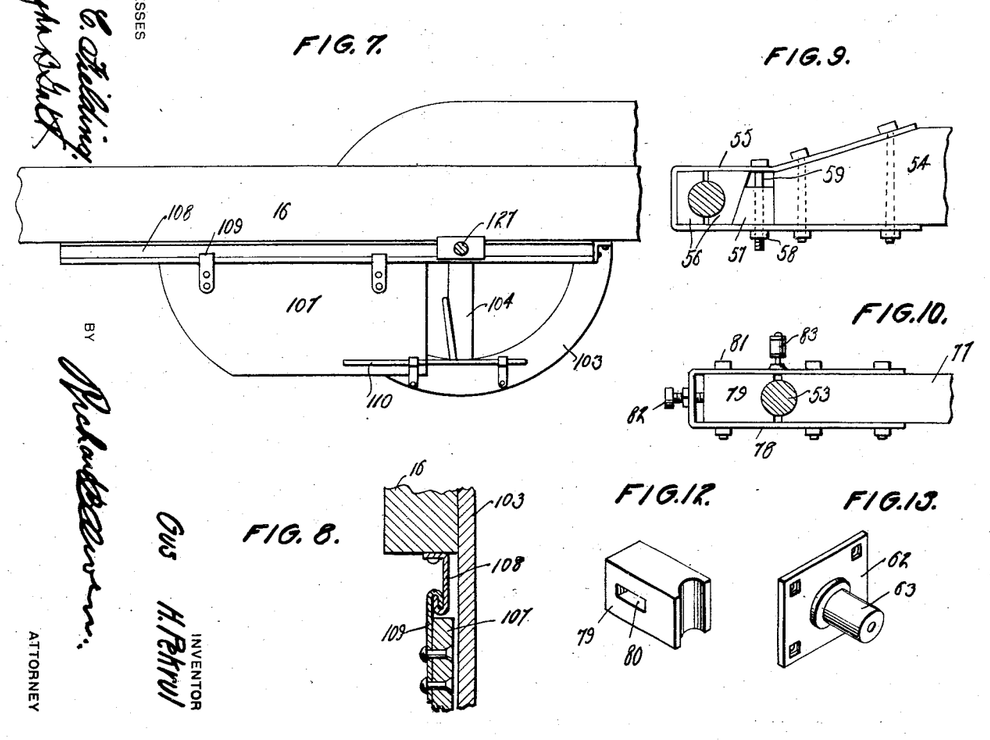
Fig. 7 is a fragmentary side elevation illustrating the manner in which the flow of air to the separating pan is controlled.
Fig. 8 is a sectional view taken through the device illustrated in Fig. 7, and illustrating the manner in which the controlling gate is suspended.
Fig. 9 is a fragmentary view illustrating the manner in which one of the shaker frame bars is connected to the controlling beam.
Fig. 10 is a similar view showing the means employed for effecting a connection between one of the rocker arms and the rear shaker controlling link.
Fig. 12 is a perspective view of one of the bearing blocks.
Fig. 13 is a similar view of one of the bearing pintles to be applied to the shaker supporting beams.
Figure 11:
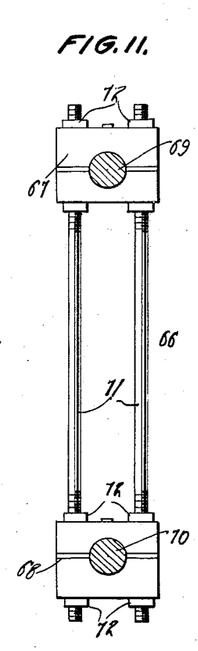
Fig. 11 is a detail view showing one of the supporting brackets for the shakers.
Figure 15:
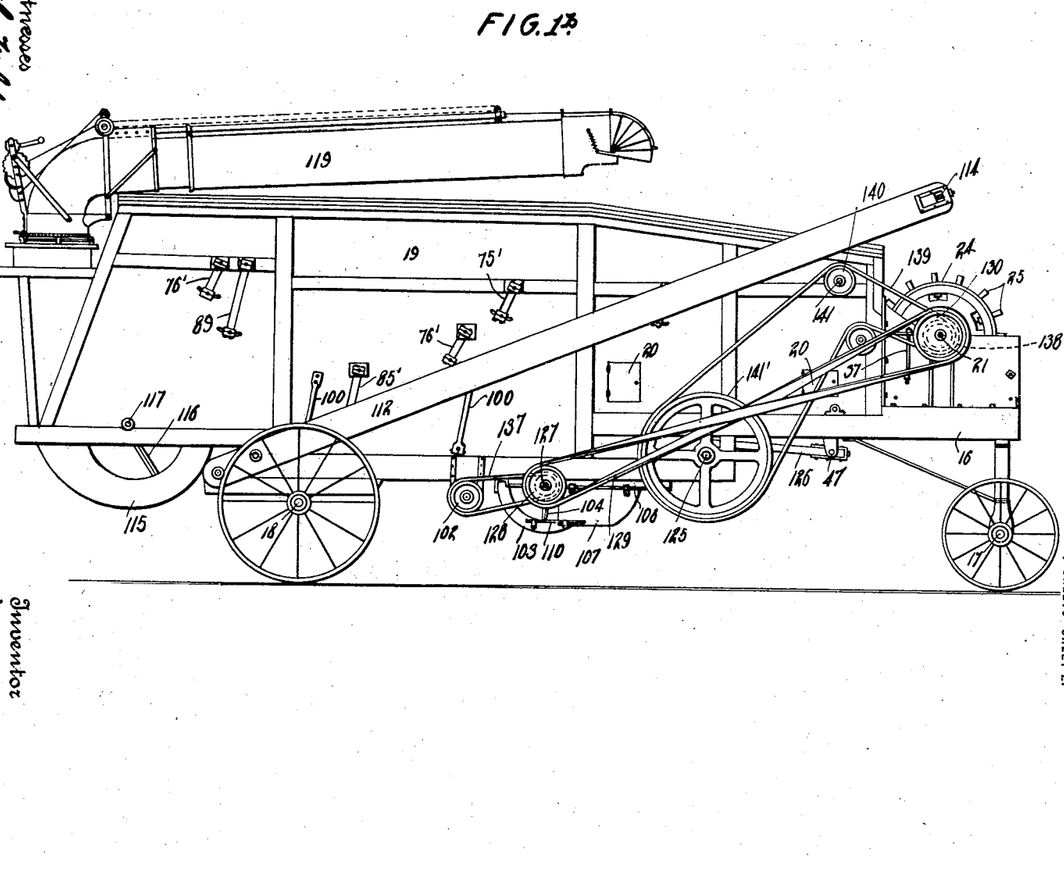
Fig. 15 is a detail sectional view illustrating the manner in which the thresher teeth are connected to the drum or cylinder.

Each of the beams 54 is provided upon its outer side near the forward end thereof with a plate 62, from the center of which extends a bearing or wrist pin 63, (see Fig. 13). The wrist pins 63 pivotally support the forward ends of the longitudinal bars 64 of the straw shaker 65. This straw shaker communicates at its forward end with the rear end of the shaker 61, and is designed to receive material from the latter. The shaker 65 may be constructed similar to the shaker 61, and inclines upwardly as it extends rearwardly. The rear end of this shaker is supported by a hanger indicated generally at 66, one being provided at each side of the machine and upon the exterior of the housing 19. These hangers comprise spaced bearings 67 and 68, the upper of which is pivoted upon a stud or boss 69 upon the exterior of the machine housing, while the bearing 68 is mounted upon a stem or stud 70 projecting outwardly from the side bar 64 near the rear end thereof. The bearings 67—68 are connected by spaced rods 71, the extremities of which are threaded and extend through the sections of the blocks 67—68. Adjusting nuts 72 are threaded upon the extremities of these rods and permit of ready adjustment of the bearing members longitudinally of the rods. This particular arrangement enables the angularity of the straw shaker to be varied at will. It will be observed, particularly with reference to Fig. 1 of the drawings, that the pintles 70 at the rear end of the shaker 65 extend through arcuate slots 73 in the side walls of the housing, the said slots being substantially concentric with the pivot support of the hangers.

The outer faces of the beams 54 near the rear end thereof are also equipped with plates such as those indicated at 62 in Fig. 13, and the studs or wrist pins 63 thereof receive bearing members at the forward end of side bars 74 of the second straw shaker 75. The forward end of this second shaker is disposed directly beneath the rear end of the shaker 65, and is designed to receive material discharged from the latter. The shaker 75 is inclined similarly to the shaker 65 and is rockably supported at its rear end by hangers 75' similar to those used for the support of the rear end of shaker 65.

Arranged in an inclined plane in the rear of shaker 75 is a shaker 76, the latter being similar in construction to shakers 65—75. The shaker 76 is rockably supported at its forward and rear ends by the hangers 76', and the forward end of this shaker is disposed beneath the rear extremity of shaker 75, so as to receive material delivered from the rear end of the last mentioned shaker. The shaker 76 receives its oscillatory motion through the medium of a link or bar 77 connected at one end to the shaker 76 and at its opposite end to the lower extremity of the rock arm 50. A detail view of one end of this link is shown in Figs. 10 and 12, and it will be observed that the link is provided at each end with a strap member 78, which slidably supports a bearing block section 79. This section has an elongated slot 80 therein through which protrudes the retaining bolt or keeper 81, and a set screw 82 threaded through the bight portion of the strap member 78 is provided for the purpose of moving the block section 79 toward or away from the wrist pin or stud with which the link is connected. An oil cup 83 may be provided to lubricate the link at its connection with the wrist pins or bearing members. By utilizing the lower ends of rock arm 50 as the means for delivering reciprocatory movement to shaker 76, it is obvious that the shakers 75 and 76 will move simultaneously but in opposite directions.

The grain pan for the threshing apparatus is indicated at 84 and is mounted for reciprocation at the bottom of the housing and stands beneath the threshing cylinder and all of the flights of straw shakers. The pan may be constructed of light metal, of a width substantially equal to the width of the machine, and this pan has its sides or longitudinal edges turned up to provide flanges 85. The rear end of the pan is reciprocably supported by the hangers 85', while the pan is connected near its forward end to the stud or pin 45 carried by the rock arm 43. The pan near its rear end is foraminated so as to provide a chaffer sieve, the sieve in the present instance comprising a mesh fabric indicated at 86.

The grain pan 84 supports the forward end of a return pan 87, the side bars 88 of which are secured to the upstanding flanges 85 of the pan. The return pan is held at its rear end in proper inclined position beneath the shaker 76 by hangers 89, and it is obvious from this construction that reciprocatory movement of the grain pan will cause the return pan to similarly move. The return pan is designed to receive grain passing through the slats of the rear shaker 76 and to divert such grain downwardly into the grain pan 84.

A sieve shoe 90 is disposed beneath the chaffer sieve 86, and is designed to receive the grain passing through the chaffer sieve. The bottom of the sieve shoe inclines upwardly from its forward to its rear end, and is mounted for sliding movement upon the cross plates 91, and the sides 92 of the shoe have adjustably arranged thereon the brackets 93 to support the sieves 94. The rear end of the shoe is also equipped with adjustable brackets 95 to support the rear ends of the sieves 94, it being preferred that the sieves be maintained in horizontal position directly beneath the chaffer sieve 86. By this particular arrangement, the sieves 94 may be moved up close beneath the chaffer sieve and may be adjusted toward or away from each other as conditions may require. The shoe receives slight longitudinal reciprocating movement through the pitman 96 connected at its forward end to the shoe and which is equipped at its rear end with a cam 97 affixed to the laterally disposed shaft 98. Any number of these pitmen may be used, two being employed in the present instance. A guide board 99 is arranged at the forward end of the shoe directly above the upper screen or sieve 94 therein, to prevent grain passing off of the said sieve at the forward ends thereof. The upstanding side members 92 of the shoe are secured to the lower ends of hangers 100 attached to the exterior of the casing or housing, and these hangers permit of the shoe reciprocating within the vehicle.

The forward end of the sieve shoe communicates with a laterally disposed groove or channel 101, within which is arranged a worm conveyer 102. This conveyer may communicate at its delivery end with a suitable receptacle or conveyer to receive the grain.

A fan or blower device is used in connection with the sieve shoe and chaffer to prevent chaff entering the conveyer 102, and this blower is disposed in advance of the sieve shoe 90. The casing for the fan or blower is indicated at 103, and extends transversely of the vehicle below the bottom thereof and slightly in advance of the forward end of the sieve shoe and the channel 101. The rear of this casing is in communication with the interior of the sieve shoe 90 at the forward end thereof, so that a blast of air created by the rotary movement of fan 104 in the fan casing will be directed across the upper end of channel 101 and into the sieve shoe beneath the screens or sieves 94. The volume and direction of the air emitted from the casing 103 may be controlled by the wind guides or dampers 105 and 106. The damper 106 is arranged at the lowest end of the opening in the fan casing, so that the air blast may be directed close to or remote from the upper end of the spiral conveyer 102, while the damper 105 is disposed substantially midway the upper and lower ends of the casing opening.

The ends of the fan casing 103 are open, and the quantity of air allowed to pass into the casing through these openings is controlled by gates 107. These gates are slidably mounted upon trackways 108 secured to the frame of the vehicle, brackets 109 being secured to the gates to engage with the trackways. The lower ends of the gates are held from swinging outwardly by the guide brackets 110.

The interior of the housing is provided with a gutter or channel 110' disposed transversely of the vehicle and in the rear of the chaffer sieve and sieve shoe. This gutter is to receive the tailings and trash which result from the threshing or separating operations, and an auger or worm conveyer 111 arranged within the gutter causes the tailings to move out of the housing at one side of the vehicle. The gutter communicates at its delivery end with the interior of a chute or conveyer housing 112, within which is arranged the conveyer 113. The forward end of the chute or casing 112 is equipped with a conventional form of belt tightener 114 so that the endless conveyer within the housing may at all times be kept at the requisite tension. It is my purpose to direct the tailings carried by the conveyer 113 into the concave or upon the threshing cylinder so that the tailings may be passed through the machine to be again operated upon, and any desired means may be employed for conveying the tailings from the end of the housing to the concave or cylinder. By thus operating upon the tailings, any grain which may have escaped in the initial operation will be recovered. The conveyer 113 may be driven by a suitable sprocket affixed to the end of shaft 98.

A stacker mechanism is used in connection with the threshing machine to remove the straw therefrom and to stack it conveniently beside the machine. A fan or beater casing 115 is arranged in the housing at the rear end thereof, and into which the straw passing beyond the rear end of the last shaker enters. A stacker fan 116 is supported in the fan casing by the shaft 117. One end of the casing 115 communicates with a stacker funnel 118, and this funnel has rotatably mounted upon its upper end the inner extremity of the stacker tube or arm 119. The arm 119 may be revolubly mounted upon the funnel 118, and may, if desired be capable of being extended. Suitable mechanism may be employed for controlling the movement of the stacker tube and for operating the extensible parts thereof.

Power is applied to the threshing machine through the medium of a belt 120 passing over a belt pulley 121 affixed to one end of shaft 21. A second pulley 122 is affixed to the shaft 21, and the belt 123, passing thereover travels around a pulley 124 affixed to one end of the blower shaft 117. The machine near its forward end is equipped with a crank shaft 125, having secured thereto one end of a pitman 126, the forward end of which is connected with the tubular member 126' surrounding the rod 47 connecting the hollow bosses 46 at the lower extremities of the rock arm 43. It is obvious, therefore, that when the shaft 125 rotates, reciprocating movement will be delivered to the rock arm 43, whereupon all of the shakers and the grain pan will be moved.

The shaft 127 which supports the blower or fan 104 is provided with a pulley 128, over which is trained a belt 129; the said belt also passing over a pulley 130 affixed to shaft 21. The shaft 127 is provided at its opposite end with a pulley 131, over which passes a belt 132. This belt 132 travels over a pulley 133 affixed to one end of the shaft supporting and operating the tailing auger 111. The belt 133 also passes over a pulley 134 affixed to one end of the cam shaft 98, and then passes to the pulley 131. The grain conveyer or worm derives its rotary movement from a belt 137 passing over a suitable pulley upon the fan shaft 127.

The shaft 21 is equipped with a belt pulley 138, over which is trained a belt 139 passing also over a belt pulley 140 affixed to one end of a shaft 141 disposed transversely of the housing 19 near the forward end thereof. The belt 139 also passes over a pulley 141' secured to one end of shaft 125 so that rotary movement may be transmitted to the last mentioned shaft. The shaft 141 is equipped with beater blades 142, and it will be observed, particularly with reference to Fig. 2A of the drawings, that this beater mechanism is disposed near the forward end of the shaker 61. By arranging the beater in this particular position, the straw thrown rearwardly from the threshing cylinder or drum is forced downwardly against the straw shakers. To prevent any of the straw evading the first shaker a check or deflector plate 143 is provided. This plate is hinged at its upper end as at 144 to the upper part of housing 19 in the rear of the beater 142, and a strap 145 maintains the plate in the proper angular position. It is obvious that the angularity of this plate may be varied as conditions require. A curtain 146 is arranged in the housing 19 beyond the check or deflector plate 143, and preferably at the rear end of straw shaker 65. This curtain prevents chaff and straw passing beyond the forward end of shaker 75.

In operation, the belt 120 is passed over a power shaft from a suitable source of motive power (not shown) and the various movable parts of the threshing mechanism at once become active. The material to be threshed is fed to the cylinder or drum at the forward end of the machine by being deposited in the concave. Self feeding mechanism may be employed for this purpose, and it will be observed that the forward end of the concave is provided with a feed board indicated at 147, and over which the material passes. The teeth of the concave and of the cylinder operate upon the material deposited therein and the kernels of grain are to a greater or less extent removed from the stalks at this initial operation. The grain kernels pass through the screens or grates 33 and drop upon the grain pan 84. A deflector plate 148 is provided at the forward end of the machine to direct the grain upon the pan and to prevent loss at this particular part of the machine. The straw passes beyond the threshing cylinder and into the housing 19, being at once delivered to the straw shaker 61. Any straw which might be thrown upwardly in the housing will be forced downwardly into hard contact with the shaker 61 by the beater 142. The check or deflector plate 143 also assists in properly positioning the straw upon the shakers. As the flights of shakers are reciprocated, the straw will be constantly kept in a state of agitation, and any grain kernels which may have remained therewith will be shaken loose and will drop into the grain pan 84. The straw passes beyond the rear end of shaker 65 and onto the forward end of shaker 75, traveling slowly up the last mentioned shaker and is then deposited upon the shaker 76. After it leaves the shaker 76 all grain will have been removed therefrom, and the straw is then drawn into the chaffer fan and forced out of the machine through the tube 118—119.

The reciprocating movement of the pan 84 causes the grain thereon to gradually move rearwardly onto the chaffer or foraminous bottom 86. The grain then drops upon the upper screen of the pair 94 carried by the sieve shoe, the reciprocating movements of the latter causing the grain to work through onto the lower screen or sieve 94. The grain is further kept in a state of agitation by the air blast entering the forward end of the sieve shoe, and this blast relieves the grain of any shells or trash which may have adhered thereto. After the grain sifts through the sieve 94, it drops upon the inclined bottom 90 of the shoe, and then passes forwardly into the channel 101, from whence it is delivered from the machine. The chaff and smaller particles or trash find their way into the channel 110' in which the tailing auger is positioned, and are conveyed laterally and into the conveyer housing 112 in one side of the machine. This trash is then moved forwardly and may be deposited upon the threshing cylinder to be again operated upon.

By reason of the fact that the housing is equipped on both sides with doors 20, it is obvious that adjustment or repair of any of the parts which cannot be made from the exterior of the machine may be readily made by having an operator pass to the interior of the housing. Adjustments of the shoe sieves may be made by moving the supporting brackets thereof, and these adjustments may be carried out while the machine is in motion. Adjustments of the various hangers may be made from the exterior of the machine, and by reason of the simplicity of the construction of these hangers it is obvious that such adjustment as is required may be made easily and quickly. The concave, also, may be adjusted from the exterior of the machine and while the latter is in operation.

The machine in its entirety has been constructed and arranged with a view to overcoming difficulties and objections common to machines now used for similar purposes, difficulty having been experienced particularly with the cylinder, concave, straw shakers and separating apparatus which includes the screens and blower. The arrangement is such that vibrations of the machine have been reduced to a minimum and lost motion or power due to unnecessary friction has been eliminated as far as possible.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a threshing machine, pairs of rock arms arranged in spaced relation, beams connecting the upper ends of one pair of arms with the corresponding ends of the other pair, a bracket on the front ends of the beams, a straw shaker carried by said bracket, a second shaker pivoted near the front ends of said beams, a third shaker pivoted near the rear ends of said beams, hangers supporting the rear ends of the pivoted shakers, a grain pan reciprocably mounted beneath all of said shakers and connected to one pair of said rock arms below the pivot thereof, a return pan beneath one of said shakers and governed in its movement by said grain pan, and pitmen connected to the lower ends of one pair of said rock arms.

In testimony whereof I affix my signature in presence of two witnesses.

GUS H. PEKRUL.

Witnesses:
E. L. HUYCK,
J. C. FELIBLE.